US012326356B2

(12) United States Patent
Kinoshita et al.

(10) Patent No.: US 12,326,356 B2
(45) Date of Patent: Jun. 10, 2025

(54) VEHICLE WEIGHT ESTIMATION APPARATUS, VEHICLE WEIGHT ESTIMATION METHOD, AND COMPUTER READABLE RECORDING MEDIUM

(71) Applicant: NEC CORPORATION, Tokyo (JP)

(72) Inventors: Shohei Kinoshita, Tokyo (JP); Murtuza Petladwala, Tokyo (JP); Shigeru Kasai, Tokyo (JP); Eisuke Saneyoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 650 days.

(21) Appl. No.: 17/637,604

(22) PCT Filed: Nov. 20, 2019

(86) PCT No.: PCT/JP2019/045499
§ 371 (c)(1),
(2) Date: Feb. 23, 2022

(87) PCT Pub. No.: WO2021/100159
PCT Pub. Date: May 27, 2021

(65) Prior Publication Data
US 2022/0283015 A1 Sep. 8, 2022

(51) Int. Cl.
*G01G 19/03* (2006.01)
*G01G 19/02* (2006.01)

(52) U.S. Cl.
CPC ............ *G01G 19/03* (2013.01); *G01G 19/022* (2013.01)

(58) Field of Classification Search
CPC .............................. G01G 19/022; G01G 19/03
See application file for complete search history.

(56) References Cited

U.S. PATENT DOCUMENTS 6,692,567 B1 * 2/2004 Tatom .................. G01G 19/024
117/1
2006/0137913 A1 6/2006 Dicko
(Continued)

FOREIGN PATENT DOCUMENTS

| JP | 2018-066637 A | 4/2018 |
| WO | 92/21008 A1 | 11/1992 |
| WO | 2012/008182 A1 | 1/2012 |

OTHER PUBLICATIONS

English translation of Written opinion for PCT Application No. PCT/JP2019/045499, mailed on Feb. 18, 2020.
(Continued)

*Primary Examiner* — Natalie Huls
(74) *Attorney, Agent, or Firm* — Sughrue Mion, PLLC

(57) ABSTRACT

A vehicle weight estimation apparatus 10 includes: a collecting unit 11 that collects vibration information indicating vibration output from a sensor 25 installed to a structure having a vibration-generating structure that generates vibration upon passage of a vehicle 30; an axle response extracting unit 12 that detects, by using the vibration information, axle responses indicating the passage of one or more axles of the vehicle 30 over the vibration-generating structure; an axle index calculating unit 13 that calculates axle indices corresponding to the individual axles based on the axle responses; a converting unit 14 that converts the axle indices into axle weights by referring to conversion information that is stored in advance and that indicates a relationship between axle indices and axle weights; and a vehicle weight calculating unit 15 that calculates the weight of the vehicle by totaling the axle weights of the individual axles.

4 Claims, 11 Drawing Sheets

(56) References Cited

U.S. PATENT DOCUMENTS

| | | | | |
|---|---|---|---|---|
| 2009/0024336 A1* | 1/2009 | Tatom | ................ | G01G 23/3728 |
| | | | | 702/56 |
| 2011/0127090 A1 | 6/2011 | Mjayaraghavan et al. | | |
| 2012/0173171 A1* | 7/2012 | Bajwa | .................... | G08G 1/015 |
| | | | | 702/56 |
| 2019/0206240 A1* | 7/2019 | Gonçalves | ............... | G08G 1/04 |
| 2019/0212223 A1* | 7/2019 | Kusaka | ................... | E01C 23/01 |

OTHER PUBLICATIONS

International Search Report for PCT/JP2019/045499 dated Feb. 18, 2020 [PCT/ISA/210].
Written Opinion for PCT/JP2019/045499 dated Feb. 18, 2020 [PCT/ISA/237].

* cited by examiner

Fig.9

| AXLE INDEX RANGE | AXLE WEIGHT |
|---|---|
| $x_1 < x \leqq x_2$ | $M_1$ |
| $x_2 < x \leqq x_3$ | $M_2$ |
| ... | ... |
| $x_m < x \leqq x_{m+1}$ | $M_m$ |

VEHICLE WEIGHT ESTIMATION APPARATUS, VEHICLE WEIGHT ESTIMATION METHOD, AND COMPUTER READABLE RECORDING MEDIUM

CROSS REFERENCE TO RELATED APPLICATIONS

This application is a National Stage of International Application No. PCT/JP2019/045499 filed Nov. 20, 2019.

TECHNICAL FIELD

The technical field relates to a vehicle weight estimation apparatus and a vehicle weight estimation method for estimating vehicle weight, and further relates to a computer readable recording medium that includes recorded thereon a program for realizing the vehicle weight estimation apparatus and vehicle weight estimation method.

BACKGROUND ART

Vehicles carrying cargo weighing more than the permitted weight (overloaded vehicles) not only are a cause of accidents but also are a cause of degradation of structures such as bridges. In view of this, techniques for estimating vehicle weight have been proposed.

As a related technique, Patent Document 1 discloses a technique for calculating vehicle weight using a weigh-in-motion (WIM) system. It is indicated that, in the WIM system disclosed in Patent Document 1, the axle weights are estimated using a mathematical approach such as the least-squares method so that the error between displacement calculated using influence line data and displacement measured using sensors is small, and the total of the estimated axle weights is regarded as vehicle weight.

LIST OF RELATED ART DOCUMENTS

Patent Document

Patent Document 1: Japanese Patent Laid-Open Publication No. 2018-066637

SUMMARY OF INVENTION

Technical Problems

However, even if the technique disclosed in Patent Document 1 is used, weight estimation can be difficult depending on bridge structure. This is because there are bridges that do not bend easily even if vehicles pass thereover. For example, in the case of bridges with high rigidity such as concrete girder bridges, which do not bend much, it may be difficult to accurately estimate vehicle weight because the amount of noise included in vibration is small and thus noise cannot be separated from vibration.

An example object of the invention is to provide a vehicle weight estimation apparatus, a vehicle weight estimation method, and a computer readable recording medium that allow the weight of a vehicle passing over (or passing, passing on) a structure to be accurately estimated.

Solution to the Problems

In order to achieve the above-described object, a vehicle weight estimation apparatus according to an example aspect of the invention includes:

- a collecting unit that collects vibration information indicating vibration output from a sensor installed to a structure having a vibration-generating structure that generates vibration upon passage of a vehicle;
- an axle response extracting unit that detects, by using the vibration information, axle responses indicating the passage of one or more axles of the vehicle over the vibration-generating structure;
- an axle index calculating unit that calculates axle indices corresponding to the individual axles based on the axle responses;
- a converting unit that converts the axle indices into axle weights by referring to conversion information that is stored in advance and that indicates a relationship between axle indices and axle weights; and
- a vehicle weight calculating unit that calculates the weight of the vehicle by totaling the axle weights of the individual axles.

In addition, in order to achieve the above-described object, a vehicle weight estimation method according to an example aspect of the invention includes:

(a) collecting vibration information indicating vibration output from a sensor installed to a structure having a vibration-generating structure that generates vibration upon passage of a vehicle;
(b) detecting, by using the vibration information, axle responses indicating the passage of one or more axles of the vehicle over the vibration-generating structure;
(c) calculating axle indices corresponding to the individual axles based on the axle responses;
(d) converting the axle indices into axle weights by referring to conversion information that is stored in advance and that indicates a relationship between axle indices and axle weights; and
(e) calculating the weight of the vehicle by totaling the axle weights of the individual axles.

Furthermore, in order to achieve the above-described object, a computer readable recording medium according to an example aspect of the invention includes recorded thereon a program including instructions that cause a computer to carry out:

(a) a step of collecting vibration information indicating vibration output from a sensor installed to a structure having a vibration-generating structure that generates vibration upon passage of a vehicle;
(b) a step of detecting, by using the vibration information, axle responses indicating the passage of one or more axles of the vehicle over the vibration-generating structure;
(c) a step of calculating axle indices corresponding to the individual axles based on the axle responses;
(d) a step of converting the axle indices into axle weights by referring to conversion information that is stored in advance and that indicates a relationship between axle indices and axle weights; and
(e) a step of calculating the weight of the vehicle by totaling the axle weights of the individual axles.

Advantageous Effects of the Invention

As described above, according to the invention, the weight of a vehicle passing over a structure can be accurately estimated.

BRIEF DESCRIPTION OF THE DRAWINGS

FIG. 9 is a diagram for describing conversion information.

EXAMPLE EMBODIMENT

In the following, an example embodiment of the invention will be described with reference to FIGS. 1 to 11.

[Apparatus Configuration]

Figure 1:
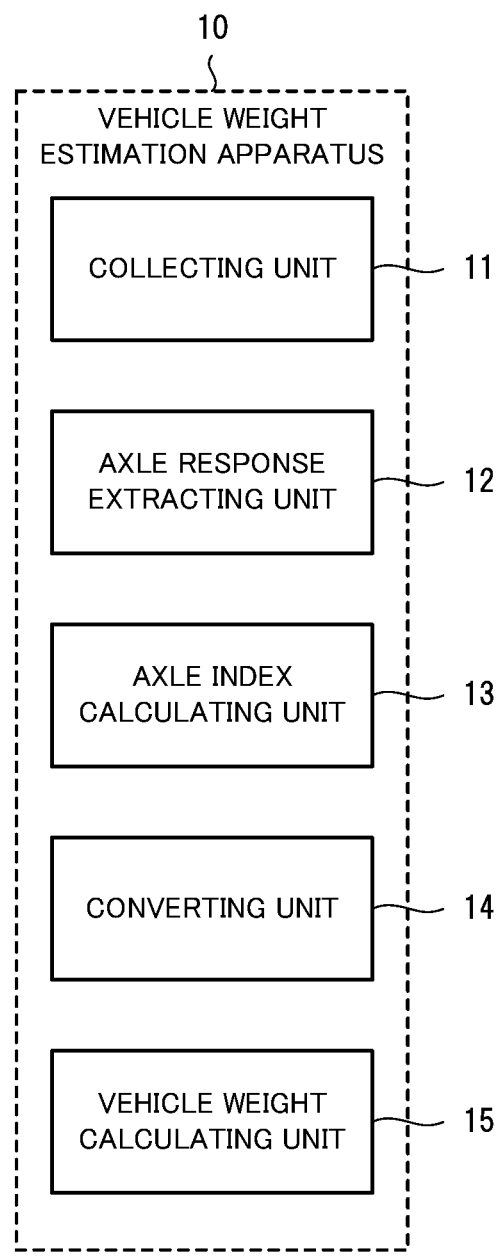
FIG. 1 is a diagram for describing one example of a vehicle weight estimation apparatus.

First, a configuration of a vehicle weight estimation apparatus 10 in the present example embodiment will be described with reference to FIG. 1. FIG. 1 is a diagram for describing one example of a vehicle weight estimation apparatus.

The vehicle weight estimation apparatus 10 illustrated in FIG. 1 is an apparatus for accurately estimating the weight of a vehicle passing over (or passing, passing on) a structure. Furthermore, as illustrated in FIG. 1, the vehicle weight estimation apparatus 10 includes a collecting unit 11, an axle response extracting unit 12, an axle index calculating unit 13, a converting unit 14, and a vehicle weight calculating unit 15.

Among these units, the collecting unit 11 collects vibration information indicating vibration output from a measurement unit (sensor) installed to a structure having a vibration-generating structure that generates vibration upon passage of a vehicle. The axle response extracting unit 12 detects, by using the vibration information, axle responses indicating the passage of one or more axles of the vehicle over the vibration-generating structure. The axle index calculating unit 13 calculates axle indices corresponding to the individual axles based on the axle responses. The converting unit 14 converts the axle indices into axle weights by referring to conversion information that is stored in advance and that indicates a relationship between axle indices and axle weights. The vehicle weight calculating unit 15 calculates the weight of the vehicle by totaling the axle weights of the individual axles.

For example, the structure is a hardened material (concrete, mortar, or the like) that is solidified using at least sand, water, and cement, metal, or a structure constructed using such materials. Also, the structure forms the entirety or part of an architectural structure. Furthermore, the structure forms the entirety or part of a machine. For example, a bridge or the like is conceivable as the structure.

The vibration-generating structure is a level difference or the like present on the structure. For example, a level difference at a bridge joint or the like may be used as the vibration-generating structure, or a level difference (bump/dent structure) allowing a preset vibration to be obtained may be provided on the structure.

The vehicle is a vehicle at least having one or more axles for installing vehicle wheels. For example, an automobile, a train, or the like is conceivable as the vehicle. Axle weights are loads that the weight of the vehicle applies to the individual axles.

Axle responses are vibrations generated in the structure by the individual axles of the vehicle when the vehicle passes over the vibration-generating structure. Each axle response is a vibration appearing within a period (window) from a response start time to a response end time.

Axle indices are indices used to calculate vehicle weight using the axle responses of the individual axles. Axle indices are correlated with axle weights. If the vibration information is acceleration data, a square root of sum of squares of acceleration data within a window of an axle response, the maximum amplitude value in acceleration data within a window of an axle response, or the maximum value among spectral amplitudes obtained through frequency conversion of acceleration data within a window of an axle response is adopted as an axle index.

The conversion information is information indicating the correlation between axle indices and axle weights. The correlation in the conversion information may be expressed using a regression function, a table, etc., for example.

In such a manner, in the present example embodiment, the weight of a vehicle passing over a structure can be accurately estimated by converting axle indices calculated for individual axles into axle weights, and calculating the weight of the vehicle by totaling the axle weights of the individual axles.

[System Configuration]

Figure 2:
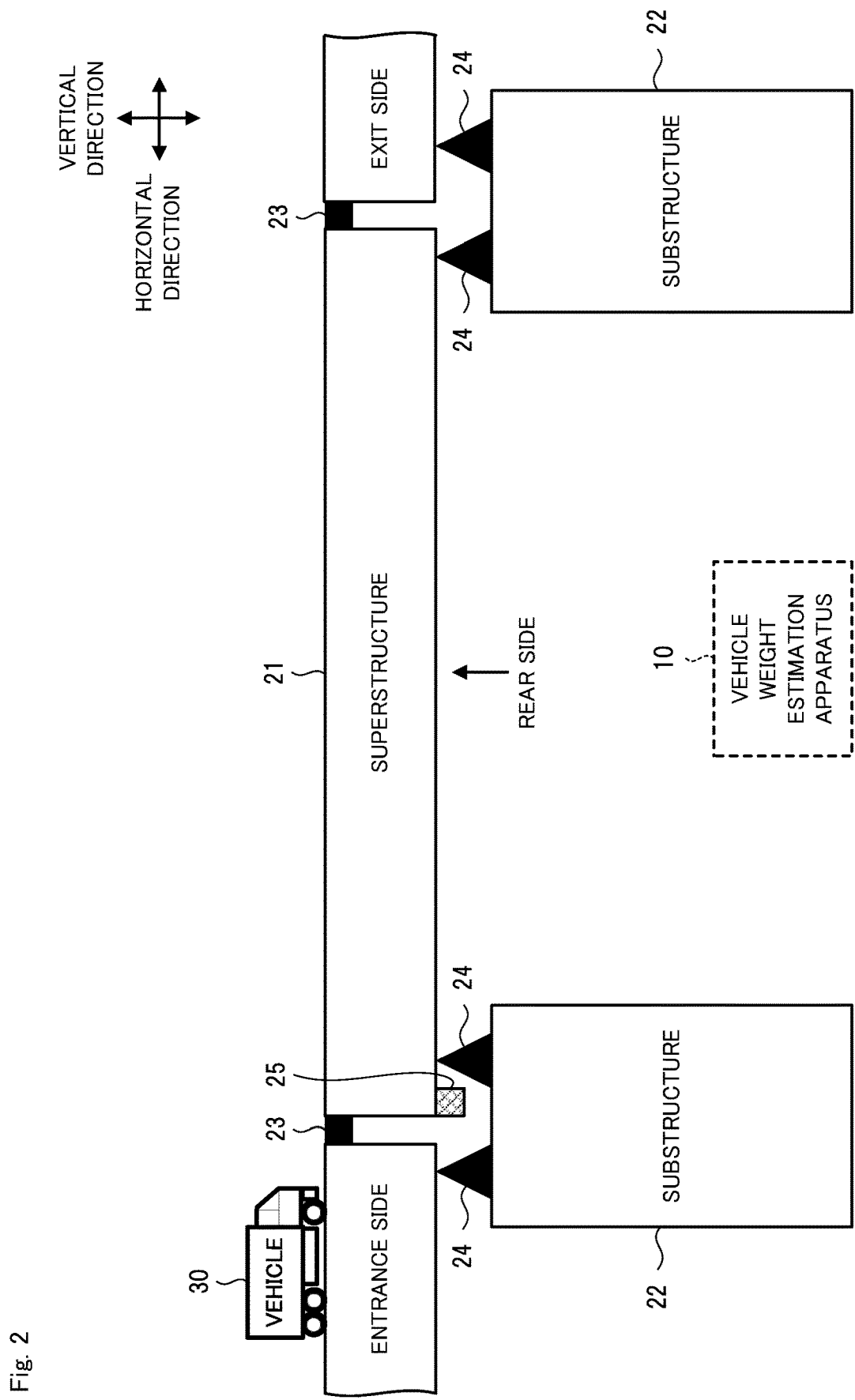
FIG. 2 is a schematic diagram for describing one example of a structure.
Figure 3:
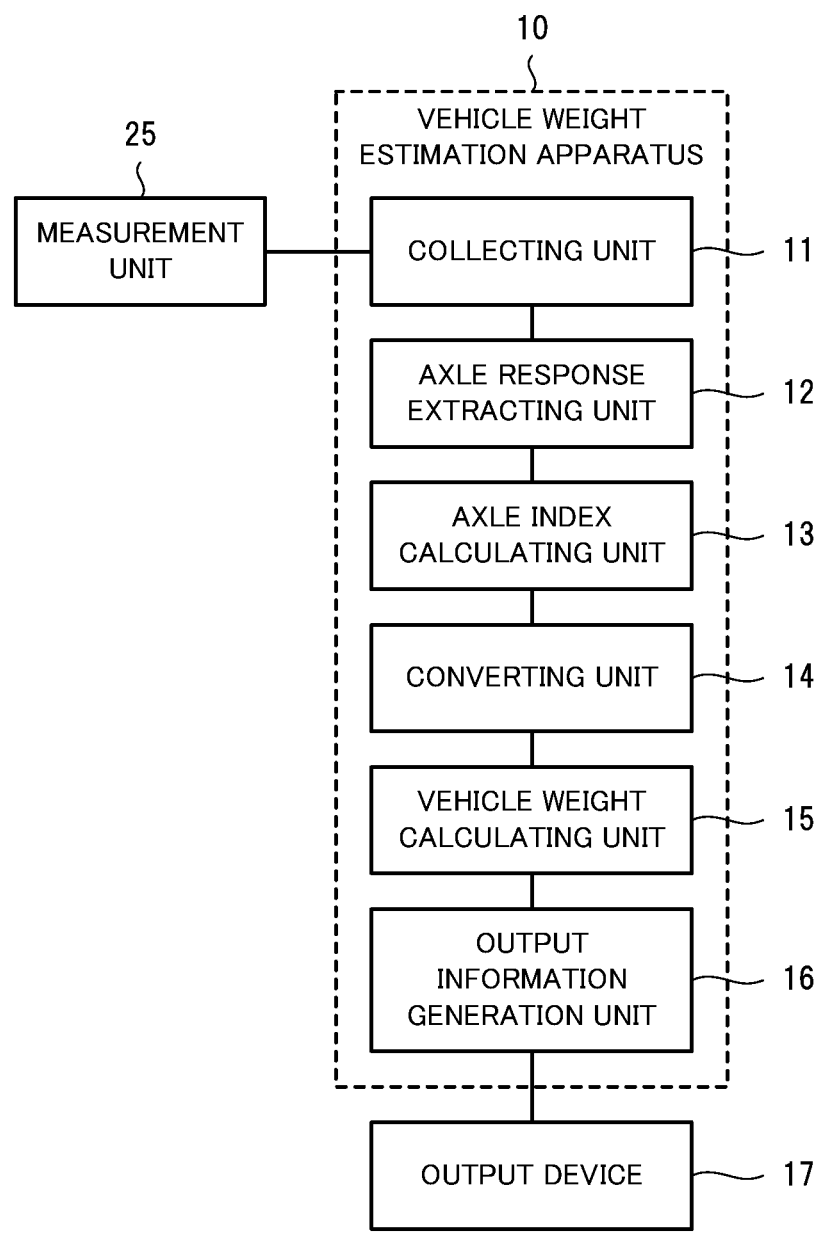
FIG. 3 is a diagram for describing one example of a system including the vehicle weight estimation apparatus.
Figure 4:
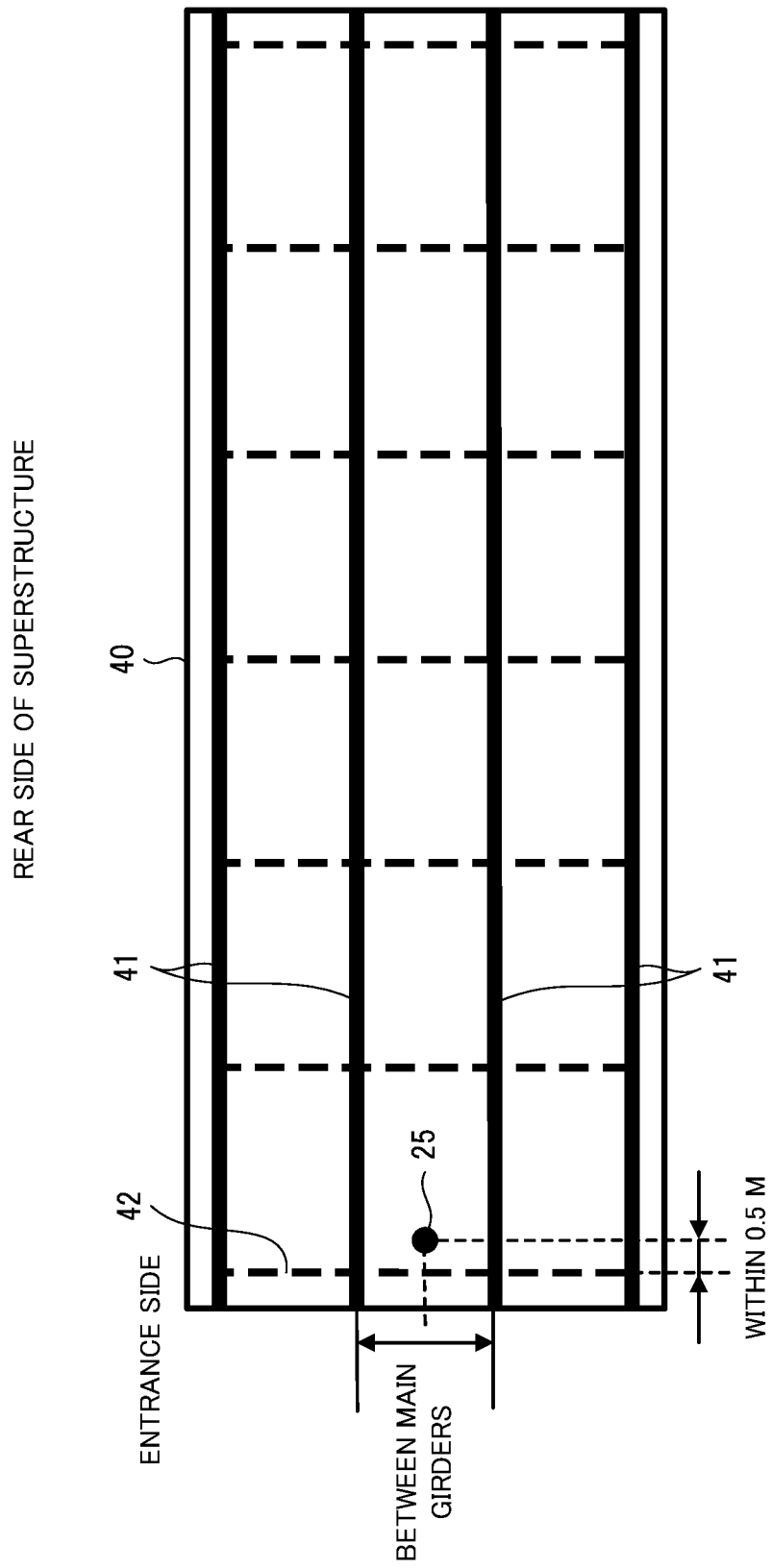
FIG. 4 is a schematic diagram for describing one example of a superstructure.

Next, the configuration of the vehicle weight estimation apparatus 10 in the present example embodiment will be described in detail with reference to FIGS. 2, 3, and 4. FIG. 2 is a schematic diagram for describing one example of a structure. FIG. 3 is a diagram for describing one example of a system including the vehicle weight estimation apparatus. FIG. 4 is a schematic diagram for describing one example of a superstructure.

A structure will be described.

The structure illustrated in FIG. 2 is a bridge, for example. The structure illustrated in FIG. 2 includes a superstructure 21, a substructure 22, expanding/contracting portions 23, and bearing portions 24. In addition, the structure illustrated in FIG. 2 is provided with a measurement unit 25. Furthermore, a vehicle 30 as illustrated in FIG. 2 passes over an expanding/contracting portion 23 from the entrance side of the superstructure 21 and moves toward the exit side of the superstructure 21.

The superstructure 21 includes a floor structure and a main structure. The floor structure is formed by a floor slab, a floor framing, etc. The main structure includes main girders, etc., and supports the floor structure and transmits load to the substructure 22.

The substructure 22 includes abutments provided at both ends of the bridge, one or more bridge piers provided in the middle of the bridge, and a foundation that supports the abutments and the bridge piers. The abutments, the bridge piers, and the foundation support the superstructure 21 and transmit load to the ground.

The expanding/contracting portions 23 are devices that allow the bridge to expand and contract at the end portions of the bridge. In the example in FIG. 2, the expanding/contracting portions 23 are provided at joints with the superstructure 21.

The bearing portions 24 are members installed between the superstructure 21 and the substructure 22. The bearing portions 24 transmit load applied to the superstructure 21 to the substructure 22.

The measurement unit 25 is a sensor attached to the superstructure 21 for measuring vibration of the structure.

The vehicle 30 travels over the superstructure 21 from the entrance side toward the exit side, and an impact is applied to the superstructure 21 by each axle of the vehicle 30.

A system will be described.

As illustrated in FIG. 3, the system in the present example embodiment includes an output device 17 and the measurement unit 25 in addition to the vehicle weight estimation apparatus 10. Furthermore, the system illustrated in FIG. 3 is a system to be used to estimate the weight of the vehicle 30.

The measurement unit 25 transmits vibration information indicating measured vibration to the vehicle weight estimation apparatus 10. For example, the measurement unit 25 is a triaxial acceleration sensor, a fiber sensor, or the like. For example, the vibration information is information indicating acceleration, or the like.

Specifically, the measurement unit 25 measures acceleration at the position where the measurement unit 25 is attached. Subsequently, the measurement unit 25 transmits a signal including the measured acceleration to the vehicle weight estimation apparatus 10. Note that wired communication, wireless communication, or the like is used for the communication between the measurement unit 25 and the vehicle weight estimation apparatus 10.

Note that, preferably, the measurement unit 25 is installed at a position that is close to an end of the structure and close to the vibration-generating structure. In the example in FIG. 2, the measurement unit 25 is installed at a position close to an expanding/contracting portion 23, near an end of the superstructure 21. One reason for this is because the smaller the distance from the ends of the structure is, the more the influence of the vibration characteristics of the structure can be reduced. Furthermore, another reason for this is because axle responses can be captured more easily and errors in the estimation of axle weights and vehicle weight can be reduced at a position closer to the vibration-generating structure.

In the example in FIG. 2, when the vehicle 30 passes over a joint (level difference; vibration-generating structure that generates vibration in the structure upon passage of the vehicle 30) between an expanding/contracting portion 23 and the superstructure 21, the superstructure 21 vibrates due to an impact being applied to the superstructure 21 with the joint serving as a fulcrum. Note that, while a joint over an expanding/contracting portion 23 is adopted as the vibration-generating structure applying an impact in FIG. 2, any vibration generating structure may be adopted as long as an impact is applied to the structure.

Note that, as illustrated in FIG. 4, the measurement unit 25 is preferably installed at a position of the floor slab 40 of the superstructure 21 that is located in the middle between main girders 41 and that is within a distance of 0.5 m from a cross girder 42 that is provided at an end of the floor slab 40 on the vehicle 30 entrance side. Alternatively, the measurement unit 25 is preferably installed at a position where the acceleration in responses (axle passage responses) when axles pass over the vibration-generating structure is greater than or equal to a predetermined threshold (for example, greater than or equal to 1 m/s$^2$). However, the installation position of the measurement unit 25 is not limited to the above-described positions.

By installing the measurement unit 25 on the rear side of the superstructure 21, the risk of exposure to rain, etc., can be avoided, and maintenance cost can be reduced. Furthermore, since there is a footing (abutment, bridge pier, or the like) at an expanding/contracting portion 23, the measurement unit 25 can be accessed more easily compared to a case in which the measurement unit 25 is installed in the middle of the superstructure 21, and thus the labor and cost required for sensor installation can be suppressed.

For example, the vehicle weight estimation apparatus 10 is an information processing apparatus such as a server computer, a personal computer, or a mobile terminal having installed thereon at least one of a central processing unit (CPU) and a field-programmable gate array (FPGA).

The output device 17 acquires output information, which has been converted by an output information generating unit 16 into a format that can be output, and outputs images, sounds, etc., generated based on the output information. For example, the output device 17 is an image display device in which liquid crystal, organic electro-luminescence (EL), or a cathode ray tube (CRT) is used, etc. Furthermore, the image display device may include an audio output device such as a speaker. Note that the output device 17 may be a printing device such as a printer. Note that the output information generating unit 16 will be described later.

The vehicle weight estimation apparatus will be described.

The collecting unit 11 collects, from the measurement unit 25, vibration information indicating vibration of the structure. Specifically, in a case in which the measurement unit 25 is an acceleration sensor, the collecting unit 11 first receives vibration information including acceleration data from the measurement unit 25. Subsequently, the collecting unit 11 transfers the vibration information to the axle response extracting unit 12.

The axle response extracting unit 12 detects, by using the vibration information, axle responses generated upon passage of the axles of the vehicle 30 over the vibration-generating structure. Specifically, the axle response extracting unit 12 first acquires the vibration information from the collecting unit 11. Subsequently, the axle response extracting unit 12, by using the acceleration data included in the vibration information, extracts a response start time, a response end time, and a window width of each axle response.

Figure 5:
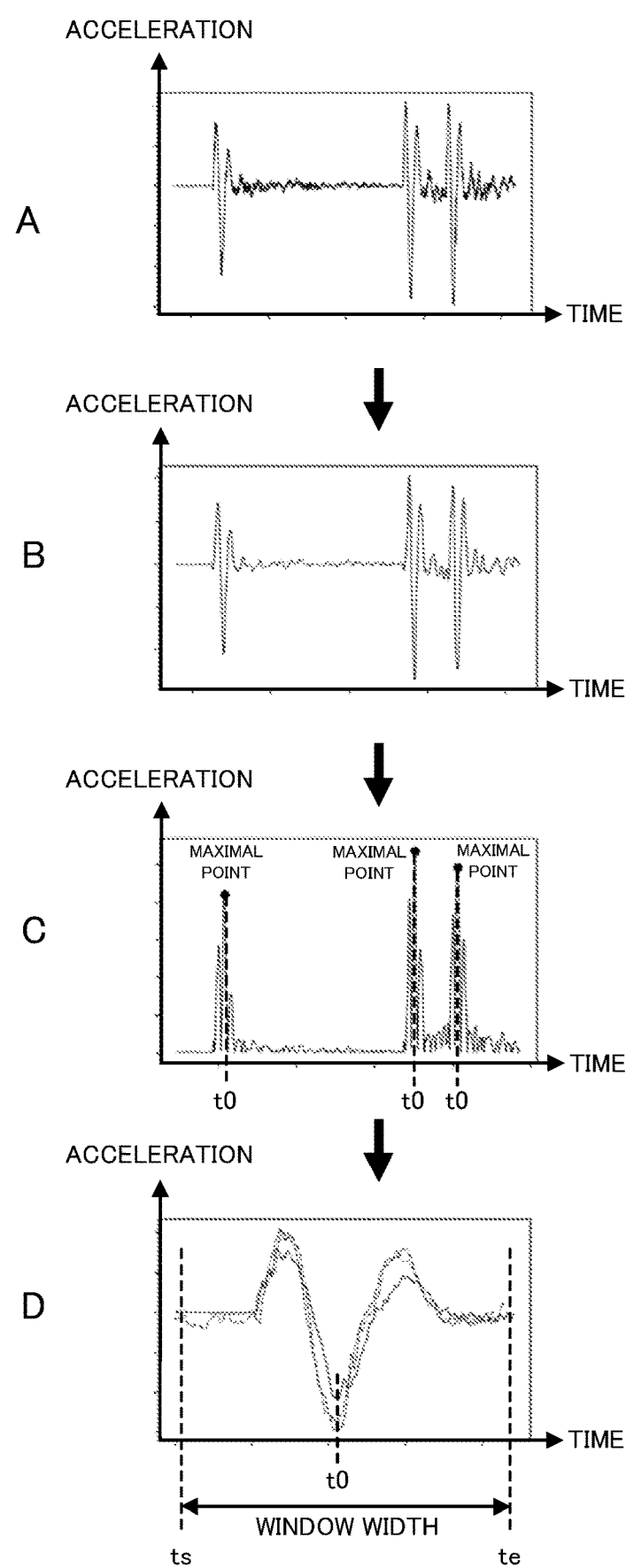
FIG. 5 is a diagram for describing a method for detecting axle responses.
Figure 6:
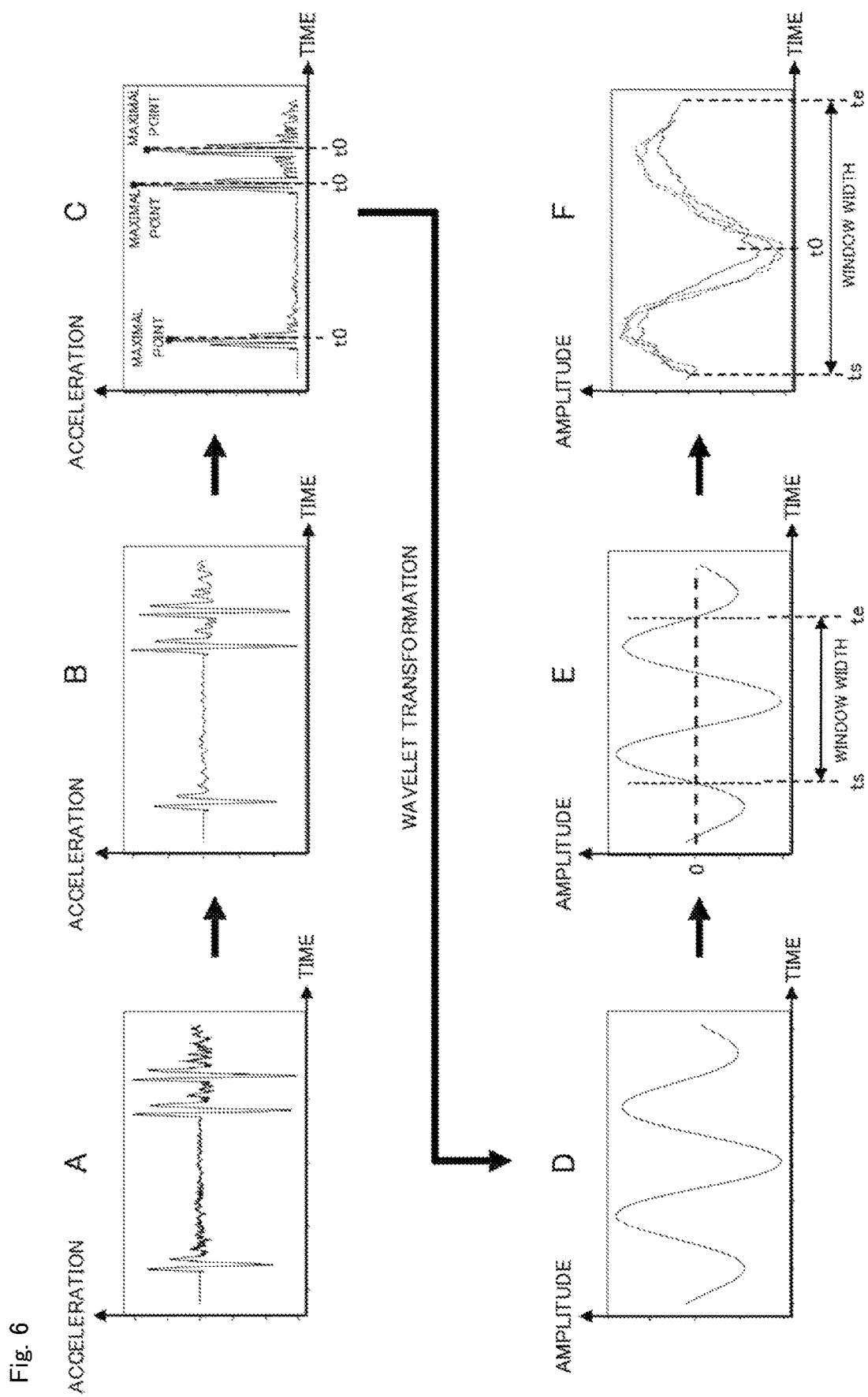
FIG. 6 is a diagram for describing a method for detecting axle responses.

For example, the detection of axle responses can be performed according to axle response detection method (1) illustrated in FIG. 5 or axle response detection method (2) illustrated in FIG. 6. FIGS. 5 and 6 are diagrams for describing methods for detecting axle responses. Note that the acceleration waveforms illustrated in FIGS. 5 and 6 indicate acceleration in vibration that a vehicle 30 having three axles generated in the structure upon passing over the vibration-generating structure. Accordingly, three axle responses are detected in the examples in FIGS. 5 and 6.

Axle response detection method (1) will be described.

First, the axle response extracting unit 12 performs frequency band limitation using filtering processing such as that using a bandpass filter on acceleration data such as that illustrated in "A" of FIG. 5, and generates data such as that illustrated in "B" of FIG. 5 obtained by removing noise components, etc., from the acceleration data.

Subsequently, the axle response extracting unit 12 calculates absolute values of the amplitude values in the data illustrated in "B" of FIG. 5 so generated, and generates data as illustrated in "C" of FIG. 5. Then, the axle response extracting unit 12 extracts maximal points using the data of the absolute values of the amplitude values so generated. For example, because there are three axles, three maximal points corresponding to the individual axles are extracted as illustrated in "C" of FIG. 5.

Subsequently, the axle response extracting unit 12 determines the window width of each extracted maximal point. For example, the window width is expressed by a time period set in advance including time t0 corresponding to the maximal point. Accordingly, if the time corresponding to the extracted maximal point is set as t0 as illustrated in "C" of FIG. 5, the response start time and the response end time are respectively set as time is preceding time t0 and time to succeeding time t0 as illustrated in "D" of FIG. 5. Note that, preferably, the window width is set as a time period of 40 ms to 50 ms having the time t0 corresponding to the maximal point at the center thereof.

Note that "D" of FIG. 5 illustrates pieces of acceleration data (waveforms) corresponding to the individual axles in an overlaid state based on the times t0 of the maximal points extracted for the individual ones of the three axles. However, the window width may be varied for each axle. For example, the window width may be changed depending on the position of the axle in the vehicle.

In such a manner, according to method (1), the axle response extracting unit 12 extracts axle responses corresponding to the individual axles as described above, and outputs the axle responses corresponding to the individual axles to the axle index calculating unit 13.

Axle response detection method (2) will be described.

First, the axle response extracting unit 12 performs filtering processing using a wavelet filter on acceleration data such as that illustrated in "A" of FIG. 6 to shape the acceleration data, and generates data such as that illustrated in "B" of FIG. 6.

Subsequently, the axle response extracting unit 12 calculates absolute values of the amplitude values in the data illustrated in "B" of FIG. 6 so generated, and generates data as illustrated in "C" of FIG. 6. Then, the axle response extracting unit 12 extracts maximal points using the data of the absolute values of the amplitude values so generated. For example, because there are three axles, three maximal points corresponding to the individual axles are extracted as illustrated in "C" of FIG. 6.

Subsequently, the axle response extracting unit 12 performs wavelet transformation on the data of the absolute values of the amplitude values such as that illustrated in "C" of FIG. 6 to extract maximum wavelet coefficient points, and acquires data (wavelet waveform) such as that illustrated in "D" of FIG. 6.

Subsequently, the axle response extracting unit 12 determines the window width of each extracted maximal point. For example, the window width is calculated by extracting zero-crossing points of a wavelet waveform as illustrated in "E" of FIG. 6. As illustrated in "E" of FIG. 6, the window width can be expressed using a response start time ts and a response end time te.

Subsequently, the axle response extracting unit 12 extracts axle responses such as those illustrated in "F" of FIG. 6 using the window width illustrated in "E" of FIG. 6, which is expressed by the response start time ts and the response end time te.

Note that "F" of FIG. 6 illustrates pieces of acceleration data (waveforms) corresponding to the individual axles in an overlaid state based on the times t0 of the maximal points extracted for the individual ones of the three axles.

In such a manner, according to method (2), the axle response extracting unit 12 extracts axle responses corresponding to the individual axles as described above, and outputs the axle responses corresponding to the individual axles to the axle index calculating unit 13.

The axle index calculating unit 13 calculates axle indices corresponding to the individual axles based on the axle responses. Specifically, the axle index calculating unit 13 first acquires the axle responses corresponding to the individual axles from the axle response extracting unit 12. Subsequently, the axle index calculating unit 13, by using the acceleration data in each axle response, calculates a square root of sum of squares of acceleration, the maximum amplitude value of acceleration data, or the maximum value among spectral amplitudes obtained through frequency conversion of acceleration data. Subsequently, the axle index calculating unit 13 outputs the axle indices calculated for the individual axles to the converting unit 14.

The calculation of an axle index will be described.

Figure 7:
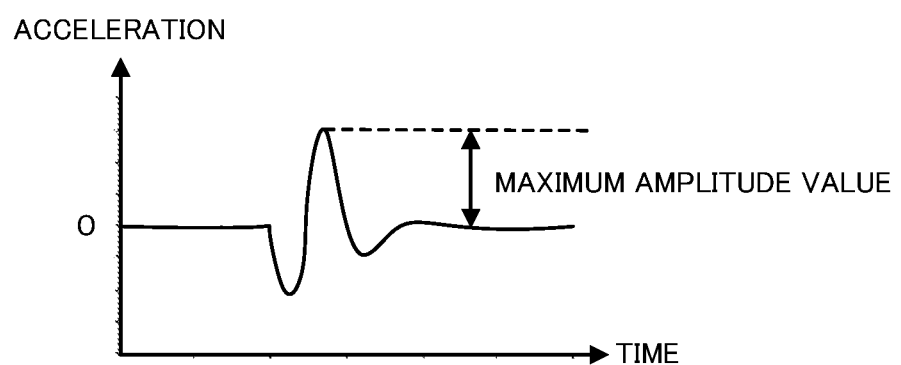
FIG. 7 is a diagram for describing one example of an axle response.

In the method of calculating a square root of sum of squares of acceleration, a square root of sum of squares is calculated using Math. 1 in a case in which the axle response is acceleration data such as that illustrated in FIG. 7, for example. FIG. 7 is a diagram for describing one example of an axle response.

$$Vi = \sqrt{\Sigma_{i=0}^{n} |a_{t_i}|^2}$$ [Math. 1]

Vi: axle index
$a_{t_i}$: acceleration amplitude

In the method of calculating the maximum amplitude value of acceleration data, the maximum amplitude value is calculated from acceleration data as illustrated in FIG. 7 in a case in which the axle response is acceleration data such as that illustrated in FIG. 7, for example.

Figure 8:
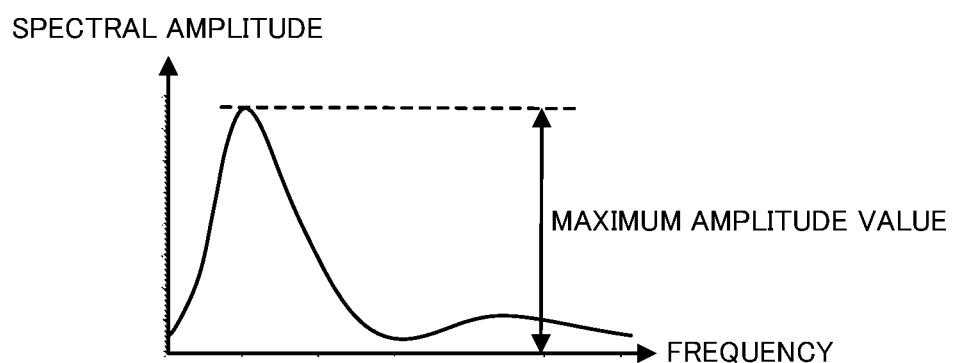
FIG. 8 is a diagram for describing one example of an axle response subjected to frequency conversion.

In the method of calculating the maximum value among spectral amplitudes obtained through frequency conversion of acceleration data, frequency conversion is performed on the axle response to convert the axle response into frequency vs. spectral amplitude data such as those illustrated in FIG. 8 in a case in which the axle response is represented by time vs. acceleration data such as that illustrated in FIG. 7, for example. Subsequently, the maximum amplitude value among the spectral amplitudes is calculated as illustrated in FIG. 8. FIG. 8 is a diagram for describing one example of an axle response subjected to frequency conversion.

The converting unit 14 calculates axle weights by using the axle indices and referring to conversion information that is stored in advance and that indicates a correlation between axle indices and axle weights. Specifically, the converting unit 14 first acquires the axle indices calculated for the individual axles. Subsequently, the converting unit 14 refers to the conversion information and converts the axle indices into axle weights of the individual axles.

The conversion information is information indicating the correlation between axle indices and axle weights. For example, the correlation in the conversion information may be expressed using a regression function. The regression function is a function such as a linear function, an n-th degree polynomial, or a non-linear function, etc. Alternatively, a table such as that illustrated in FIG. 9 may be used as the conversion information. FIG. 9 is a diagram for describing the conversion information.

In a case in which the table illustrated in FIG. 9 is used, the converting unit 14 converts an axle index into an axle weight by, when the axle index is x, detecting an axle index range (range x1<x≤x2, range x2<x≤x3, . . . or range xm<x≤xm+1) that includes the axle index x and choosing a corresponding one among axle weights (M1, M2, . . . , Mm) that are associated with the respective axle index ranges.

Because the table varies depending on the axle index type (a square root of sum of squares of acceleration, the maximum amplitude value of acceleration data, or the maximum value among spectral amplitudes obtained through frequency conversion of acceleration data), a different table is necessary for each axle index.

The vehicle weight calculating unit 15 calculates the weight of the vehicle by totaling the axle weights of the individual axles. Specifically, the vehicle weight calculating unit 15 first acquires the axle weights of the individual axles from the converting unit 14. Subsequently, the vehicle weight calculating unit 15 calculates the vehicle weight by totaling the acquired axle weights.

Furthermore, while the axle weights corresponding to the individual axle indices are calculated first and then the vehicle weight is calculated by totaling the axle weights in the above-described example, the axle indices may be totaled first and then the axle weights may be calculated using the totaled axle indices.

The output information generating unit 16 generates output information for causing the output device 17 to output the calculated vehicle weight, and outputs the generated output information to the output device 17. Subsequently, the output device 17 outputs the vehicle weight based on the output information. Note that not only the vehicle weight but also the axle weights of the individual axles may be displayed.

[Apparatus Operation]

Figure 10:
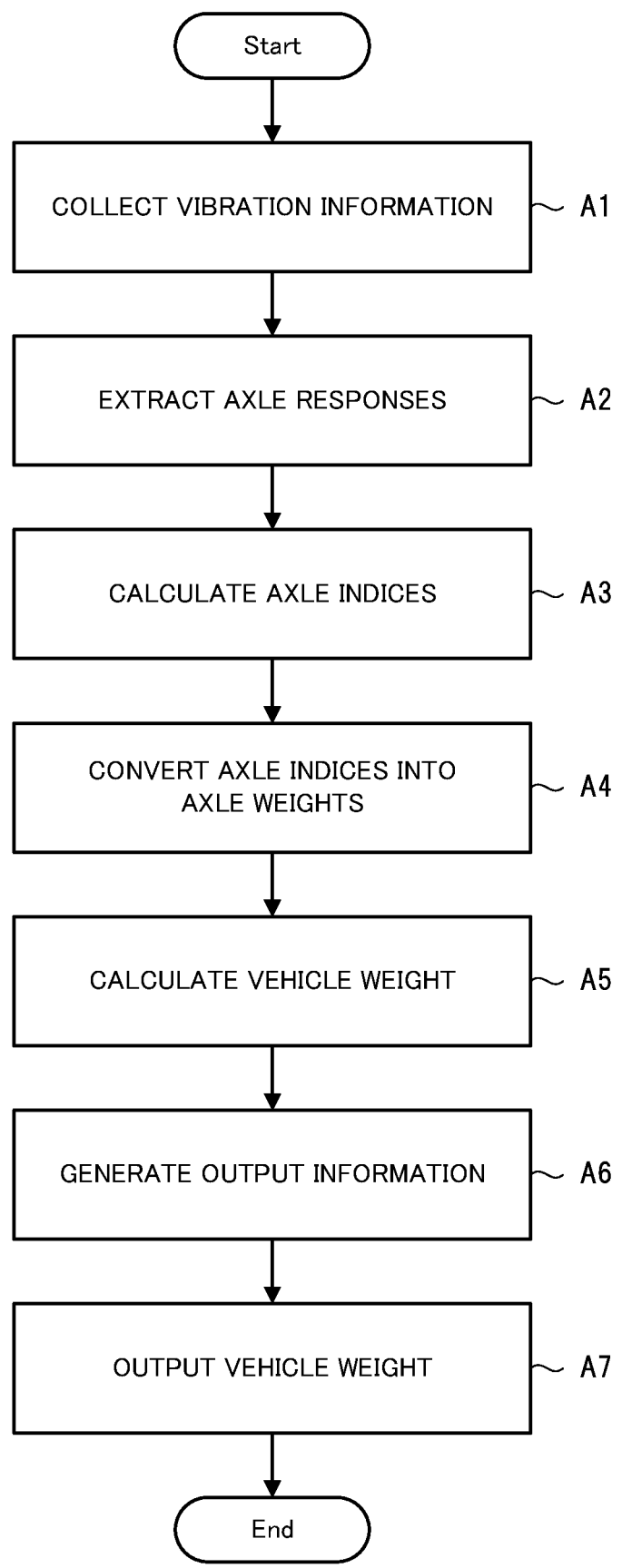
FIG. 10 is a diagram illustrating one example of operations of the vehicle weight estimation apparatus.

Next, operations of the vehicle weight estimation apparatus in the example embodiment of the invention will be described with reference to FIG. 10. FIG. 10 is a diagram illustrating one example of the operations of the vehicle weight estimation apparatus. FIGS. 2 to 9 will be referred to as needed in the following description. Furthermore, in the present example embodiment, a vehicle weight estimation method is implemented by causing the vehicle weight estimation apparatus to operate. Accordingly, the following description of the operations of the vehicle weight estimation apparatus is substituted for the description of the vehicle weight estimation method in the present example embodiment.

As illustrated in FIG. 10, the collecting unit 11 first collects vibration information indicating vibration generated in the structure from the measurement unit 25 (step A1). Specifically, in step A1, the collecting unit 11 first receives vibration information including acceleration data from the measurement unit 25 in a case in which the measurement unit 25 is an acceleration sensor. Subsequently in step A1, the collecting unit 11 transfers the vibration information to the axle response extracting unit 12.

Next, the axle response extracting unit 12 detects, by using the vibration information, axle responses generated upon passage of the axles of the vehicle 30 over the vibration-generating structure (step A2). Specifically, in step A2, the axle response extracting unit 12 first acquires the vibration information from the collecting unit 11. Subsequently in step A2, the axle response extracting unit 12 extracts the response start times, the response end times, and the window widths of the axle responses. For example, the axle responses can be detected according to axle response detection methods (1) and (2) described above.

Next, the axle index calculating unit 13 calculates axle indices corresponding to the individual axles based on the axle responses (step A3). Specifically, in step A3, the axle index calculating unit 13 first acquires the axle responses corresponding to the individual axles from the axle response extracting unit 12. Subsequently in step A3, the axle index calculating unit 13, by using the acceleration data in each axle response, calculates a square root of sum of squares of acceleration, the maximum amplitude value of acceleration data, or the maximum value among spectral amplitudes obtained through frequency conversion of acceleration data. Subsequently in step A3, the axle index calculating unit 13 outputs the axle indices calculated for the individual axles to the converting unit 14.

Next, the converting unit 14 calculates axle weights by using the axle indices and referring to conversion information that is stored in advance and that indicates a correlation between axle indices and axle weights (step A4). Specifically, in step A4, the converting unit 14 first acquires the axle indices calculated for the individual axles. Subsequently in step A4, the converting unit 14 refers to the conversion information and converts the axle indices into axle weights of the individual axles.

Next, the vehicle weight calculating unit 15 calculates the weight of the vehicle by totaling the axle weights of the individual axles (step A5). Specifically, in step A5, the vehicle weight calculating unit 15 first acquires the axle weights of the individual axles from the converting unit 14. Subsequently in step A5, the vehicle weight calculating unit 15 calculates the vehicle weight by totaling the acquired axle weights.

Furthermore, while the axle weights corresponding to the individual axle indices are calculated first and then the vehicle weight is calculated by totaling the axle weights in the above-described example, the axle indices may be totaled first and then the axle weights may be calculated using the totaled axle indices.

Next, the output information generating unit 16 generates output information for causing the output device 17 to output the calculated vehicle weight (step A6), and outputs the generated output information to the output device 17 (step A7). Subsequently, the output device 17 outputs the vehicle weight based on the output information. Note that not only the vehicle weight but also the axle weights of the individual axles may be displayed.

Effects of Example Embodiment

In such a manner, according to the present example embodiment, the weight of a vehicle passing over a structure can be accurately estimated by converting axle indices calculated for individual axles into axle weights, and calculating the weight of the vehicle by totaling the axle weights of the individual axles.

[Program]

It suffices for a program in the example embodiment of the invention to be a program that causes a computer to carry out steps A1 to A7 illustrated in FIG. 10. By installing this program on a computer and executing the program, the vehicle weight estimation apparatus and vehicle weight estimation method in the present example embodiment can be realized. In this case, the processor of the computer functions and performs processing as the collecting unit 11, the axle response extracting unit 12, the axle index calculating unit 13, the converting unit 14, the vehicle weight calculating unit 15, and the output information generating unit 16.

Furthermore, the program in the present example embodiment may be executed by a computer system formed by a plurality of computers. In this case, the computers may each function as one of the collecting unit 11, the axle response extracting unit 12, the axle index calculating unit 13, the converting unit 14, the vehicle weight calculating unit 15, and the output information generating unit 16, for example.

[Physical Configuration]

Figure 11:
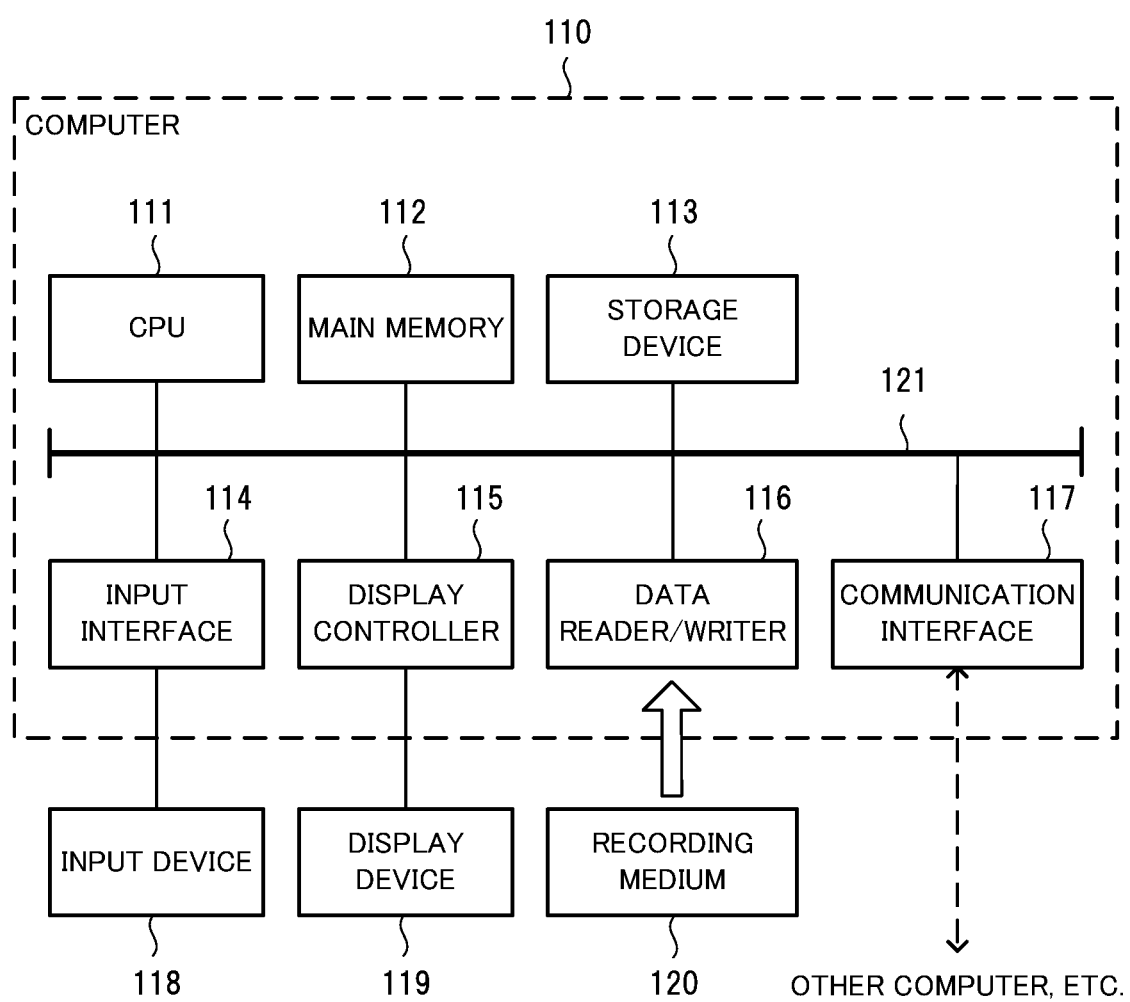
FIG. 11 is a diagram illustrating one example of a computer for realizing the vehicle weight estimation apparatus.

Here, a computer that realizes the vehicle weight estimation apparatus by executing the program in the example embodiment will be described with reference to FIG. 11. FIG. 11 is a diagram illustrating one example of a computer for realizing the vehicle weight estimation apparatus in the example embodiment of the invention.

As illustrated in FIG. 11, a computer 110 includes a CPU 111, a main memory 112, a storage device 113, an input interface 114, a display controller 115, a data reader/writer 116, and a communication interface 117. These components are connected via a bus 121 so as to be capable of performing data communication with one another. Note that the computer 110 may include a graphics processing unit (GPU) or an FPGA in addition to the CPU 111 or in place of the CPU 111.

The CPU 111 loads the program (codes) in the present example embodiment, which is stored in the storage device 113, onto the main memory 112, and performs various computations by executing these codes in a predetermined order. The main memory 112 is typically a volatile storage device such as a dynamic random access memory (DRAM). Furthermore, the program in the present example embodiment is provided in a state such that the program is stored in a computer readable recording medium 120. Note that the program in the present example embodiment may also be a program that is distributed on the Internet, to which the computer 110 is connected via the communication interface 117. Note that the recording medium 120 is a non-volatile recording medium.

In addition, specific examples of the storage device 113 include semiconductor storage devices such as a flash memory, in addition to hard disk drives. The input interface 114 mediates data transmission between the CPU 111 and input equipment 118 such as a keyboard and a mouse. The display controller 115 is connected to a display device 119, and controls the display performed by the display device 119.

The data reader/writer 116 mediates data transmission between the CPU 111 and the recording medium 120, and executes the reading out of the program from the recording medium 120 and the writing of results of processing in the computer 110 to the recording medium 120. The communication interface 117 mediates data transmission between the CPU 111 and other computers.

Furthermore, specific examples of the recording medium 120 include a general-purpose semiconductor storage device such as a CompactFlash (registered trademark, CF) card or a Secure Digital (SD) card, a magnetic recording medium such as a flexible disk, and an optical recording medium such as a compact disk read-only memory (CD-ROM).

Note that the vehicle weight estimation apparatus 10 in the present example embodiment can also be realized by using pieces of hardware corresponding to the respective units, rather than using a computer on which the program is installed. Furthermore, a part of the vehicle weight estimation apparatus 10 may be realized by using a program, and the remaining part of the vehicle weight estimation apparatus 10 may be realized by using hardware.

[Supplementary Note]

In relation to the above example embodiment, the following Supplementary notes are further disclosed. While a part of or the entirety of the above-described example embodiment can be expressed by (Supplementary note 1) to (Supplementary note 9) described in the following, the invention is not limited to the following description.

(Supplementary Note 1)

A vehicle weight estimation apparatus including:
- a collecting unit configured to collect vibration information indicating vibration output from a sensor installed to a structure having a vibration-generating structure that generates vibration upon passage of a vehicle;
- an axle response extracting unit configured to detect, by using the vibration information, axle responses indicating the passage of one or more axles of the vehicle over the vibration-generating structure;
- an axle index calculating unit configured to calculate axle indices corresponding to the individual axles based on the axle responses;
- a converting unit configured to convert the axle indices into axle weights by referring to conversion information that is stored in advance and that indicates a relationship between axle indices and axle weights; and
- a vehicle weight calculating unit configured to calculate the weight of the vehicle by totaling the axle weights of the individual axles.

(Supplementary Note 2)

The vehicle weight estimation apparatus according to Supplementary note 1, wherein
the axle response extracting unit extracts response start times, response end times, and window widths of the axle responses.

(Supplementary Note 3)

The vehicle weight estimation apparatus according to Supplementary note 2, wherein
if each of the axle responses includes acceleration data, a square root of sum of squares of the acceleration in the axle response, the maximum amplitude value in the acceleration data in the axle response, or the maximum value among spectral amplitudes obtained through frequency conversion of the acceleration data in the axle response is adopted as an axle index.

(Supplementary Note 4)

A vehicle weight estimation method including:
(a) a step of collecting vibration information indicating vibration output from a sensor installed to a structure having a vibration-generating structure that generates vibration upon passage of a vehicle;
(b) a step of detecting, by using the vibration information, axle responses indicating the passage of one or more axles of the vehicle over the vibration-generating structure;
(c) a step of calculating axle indices corresponding to the individual axles based on the axle responses;
(d) a step of converting the axle indices into axle weights by referring to conversion information that is stored in advance and that indicates a relationship between axle indices and axle weights; and
(e) a step of calculating the weight of the vehicle by totaling the axle weights of the individual axles.

(Supplementary Note 5)

The vehicle weight estimation method according to Supplementary note 4, wherein in the (b) step, response start times, response end times, and window widths of the axle responses are extracted.

(Supplementary Note 6)

The vehicle weight estimation method according to Supplementary note 5, wherein
if each of the axle responses includes acceleration data, a square root of sum of squares of the acceleration in the axle response, the maximum amplitude value in the acceleration data in the axle response, or the maximum value among spectral amplitudes obtained through frequency conversion of the acceleration data in the axle response is adopted as an axle index.

(Supplementary Note 7)

A computer readable recording medium that includes a program recorded thereon, the program including instructions that cause a computer to carry out:
(a) a step of collecting vibration information indicating vibration output from a sensor installed to a structure having a vibration-generating structure that generates vibration upon passage of a vehicle;
(b) a step of detecting, by using the vibration information, axle responses indicating the passage of one or more axles of the vehicle over the vibration-generating structure;
(c) a step of calculating axle indices corresponding to the individual axles based on the axle responses;
(d) a step of converting the axle indices into axle weights by referring to conversion information that is stored in advance and that indicates a relationship between axle indices and axle weights; and
(e) a step of calculating the weight of the vehicle by totaling the axle weights of the individual axles.

(Supplementary Note 8)

The computer readable recording medium according to Supplementary note 7, wherein
in the (b) step, response start times, response end times, and window widths of the axle responses are extracted.

(Supplementary Note 9)

The computer readable recording medium according to Supplementary note 8, wherein
if each of the axle responses includes acceleration data, a square root of sum of squares of the acceleration in the axle response, the maximum amplitude value in the acceleration data in the axle response, or the maximum value among spectral amplitudes obtained through frequency conversion of the acceleration data in the axle response is adopted as an axle index.

The invention has been described with reference to an example embodiment above, but the invention is not limited to the above-described example embodiment. Within the scope of the invention, various changes that could be understood by a person skilled in the art could be applied to the configurations and details of the invention.

INDUSTRIAL APPLICABILITY

As described above, according to the invention, the weight of a vehicle passing over a structure can be accurately estimated. The invention is useful in fields in which vehicle weight needs to be estimated.

REFERENCE SIGNS LIST

10 Vehicle weight estimation apparatus
11 Collecting unit
12 Axle response extracting unit
13 Axle index calculating unit
14 Converting unit
15 Vehicle weight calculating unit
16 Output information generating unit
17 Output device
21 Superstructure
22 Substructure
23 Expanding/contracting portion
24 Bearing portion
25 Measurement unit
30 Vehicle
40 Floor slab
41 Main girder
42 Cross girder
110 Computer
111 CPU
112 Main memory
113 Storage device
114 Input interface
115 Display controller
116 Data reader/writer
117 Communication interface
118 Input equipment
119 Display device
120 Storage medium
121 Bus

The invention claimed is:

1. A vehicle weight estimation apparatus comprising:
a memory storing one or more instructions; and
a processor configured to execute the one or more instructions to:
when the vehicle passes through a vibration-generating structure that is a bump/dent structure that obtains a preset vibration, collect vibration information indicating vibration output from a sensor installed in a structure having the vibration-generating structure;
by using the vibration information, detect axle responses indicating vibration generated in the structure for each axle when the vehicle passes over the vibration-generating structure;
calculate axle indices corresponding to individual axles based on the axle responses for each axle;
convert the axle indices into axle weights by referring to conversion information that is stored in advance and that indicates a relationship between the axle indices and the axle weights;
calculate the weight of the vehicle by totaling the axle weights of the individual axles; and
extract response start times, response end times, and window widths of the axle responses,
wherein each axle response of the axle responses includes acceleration data, and
wherein a square root of sum of squares of acceleration in the axle response, the maximum amplitude value in the acceleration data in the axle response, or the maximum value among spectral amplitudes obtained through frequency conversion of the acceleration data in the axle response is adopted as an axle index.

2. The vehicle weight estimation apparatus of claim 1, wherein the vibration-generating structure utilizes a step at a joint between an elastic portion and an upper structure.

3. A vehicle weight estimation method comprising:
when the vehicle passes through a vibration-generating structure that is a bump/dent structure that obtains a preset vibration, collecting vibration information indicating vibration output from a sensor installed in a structure having the vibration-generating structure;
detecting, by using the vibration information, axle responses indicating the vibration generated in the structure for each axle when the vehicle passes over the vibration-generating structure;
calculating axle indices corresponding to individual axles based on the axle responses for each axle;

converting the axle indices into axle weights by referring to conversion information that is stored in advance and that indicates a relationship between the axle indices and the axle weights;

calculating the weight of the vehicle by totaling the axle weights of the individual axles; and extracting response start times, response end times, and window widths of the axle responses, wherein each axle response of the axle responses includes acceleration data, and wherein a square root of sum of squares of acceleration in the axle response, the maximum amplitude value in the acceleration data in the axle response, or the maximum value among spectral amplitudes obtained through frequency conversion of the acceleration data in the axle response is adopted as an axle index.

4. A non-transitory computer readable recording medium that includes a program recorded thereon, the program including instructions that cause a computer to carry out:

when the vehicle passes through a vibration-generating structure that is a bump/dent structure that obtains a preset vibration, collecting vibration information indicating vibration output from a sensor installed in a structure having the vibration-generating structure;

detecting, by using the vibration information, axle responses indicating the vibration generated in the structure for each axle when the vehicle passes over the vibration-generating structure;

calculating axle indices corresponding to individual axles based on the axle responses for each axle;

converting the axle indices into axle weights by referring to conversion information that is stored in advance and that indicates a relationship between the axle indices and the axle weights;

calculating the weight of the vehicle by totaling the axle weights of the individual axles; and extracting response start times, response end times, and window widths of the axle responses, wherein each axle response of the axle responses includes acceleration data, and wherein a square root of sum of squares of acceleration in the axle response, the maximum amplitude value in the acceleration data in the axle response, or the maximum value among spectral amplitudes obtained through frequency conversion of the acceleration data in the axle response is adopted as an axle index.

\* \* \* \* \*